UNITED STATES PATENT OFFICE.

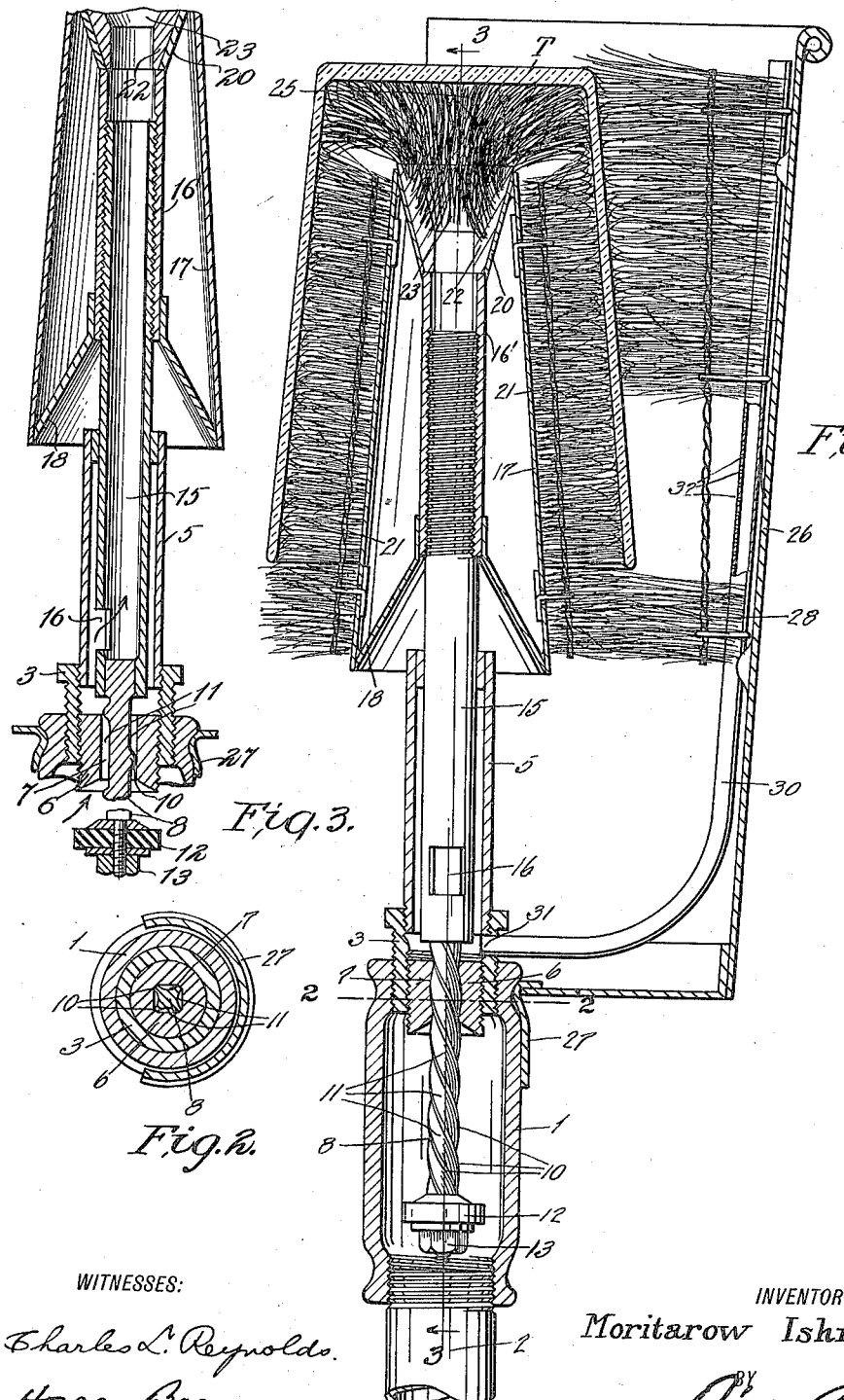

MORITAROW ISHIDA, OF SEATTLE, WASHINGTON.

APPARATUS FOR WASHING TUMBLERS.

1,153,308.

Specification of Letters Patent. Patented Sept. 14, 1915.

Application filed November 30, 1914. Serial No. 874,674.

*To all whom it may concern:*

Be it known that I, MORITAROW ISHIDA, a subject of the Emperor of Japan, residing at Seattle, in the county of King and State of Washington, have invented certain new and useful Improvements in Apparatus for Washing Tumblers, of which the following is a specification.

This invention relates to improvements in apparatus for washing tumblers, beer glasses or similar articles.

The object of the invention is the provision of a device of a simple construction and operation that will clean and scour glassware rapidly and with the minimum expenditure of labor and waste of water.

The invention consists in the novel construction of a glass-ware washing machine, and the adaptation and combination of parts thereof, as will be fully described in the following specification, illustrated in the accompanying drawings, and finally set forth in the appended claims.

Referring to said drawings, Figure 1 is a view principally in vertical section of a glass-ware washing machine embodying my invention. Fig. 2 is a cross-sectional view through 2—2 of Fig. 1. Fig. 3 is a view in longitudinal vertical section on broken line 3—3 of Fig. 1, the brushes being removed.

Referring to said views, the reference numeral 1 designates a chambered cylinder provided at one end with screw-threads through which connection is made with a pipe 2 leading from a source of water supply under pressure, and at its other end making similar connection with a bushing 3 which, in turn, supports a tubular extension 5. Said bushing is provided internally with screw-threads with which a nut 6 is engaged. Said nut is formed with an axially arranged passage 7 of substantially rectangular configuration in cross-section having its interior walls arranged spirally to engage and co-act with a spiral spindle 8, as will presently be explained.

The spindle 8 is provided with an exterior surface formed with spirally arranged ridges 10, and therebetween are formed depressed channels 11 for the passage of water about said spindle and through the nut 6, as will be understood by an inspection of Fig. 2. The lower end of the spindle is provided with a rubber disk 12 or the like, secured by nut 13 to coöperate with the lower end of the nut 6 as a valve to control the passage of water through the passage 7, and as an operating plunger, the water that enters through the pipe 2 and flows upwardly through the chambered cylinder 1 creating a pressure against the bottom of the disk 12 and lifting the spindle 8 and parts connected therewith, after such parts have been moved downwardly by hand into the position shown in Fig. 1.

Rigidly secured to the upper end of the spindle 8 is a tubular post 15 having an inlet opening 16 at its lower end to admit water to its interior, whence it is directed upwardly. Said post extends upwardly where it is adapted to be reciprocatively extended through the extension 5 and is provided at its upper extremity with exterior screwthreads adapted to make rigid connection with an interior sleeve 16' of a brush-head. Said brush-head is composed of a frusto-conical outer shell 17 and is rigidly connected to the sleeve 16' by lower frame-member 18 and a funnel-shaped socket 20 at its upper end. Brushes 21 are secured to the exterior surface of the shell 17 and an axially bored frusto-conical brush-bearing plug 22 is adapted to be frictionally seated in said socket 20.

The water allowed to escape through the grooves 11, opening 16 and the interior of post 15, escapes through the bore 23 of the plug 22 through the brush 25 against the interior of the tumbler or other hollow article held thereover, and thence percolates downwardly through the side brushes 21 and against the inside of the tumbler.

A casing 26 is provided exteriorly of the shell 17 and spaced therefrom, which is rigidly mounted, as at 27, upon the chambered cylinder 1. Said casing is open at one side and is provided with one or more suitable brushes 28 directed toward said shell and adapted to scour the outer surface of the glasses.

One or more branch water-pipes 30 are connected, as at 31, with the interior of the member 3 through which water is sprayed between the brushes 28 upon the outer surface of the glasses through apertures 32 when the valve is depressed.

The operation of the apparatus may be described as follows: The pressure of water in the pipe 2 upon the disk 12 is normally sufficient to force the spindle 8 to its uppermost extent and engage such disk against the valve-seat at the lower end of nut 6, to prevent the passage of water therethrough. The operator, by placing a tumbler, indicated by the reference character T in Fig. 1, over the brush-head and exerting some pressure thereon, forces the head downwardly in opposition to the force of water in pipe 2, unseating the valve disk 12 to allow the water to escape through the grooves 11 and at the same time causes the head to rotate by reason of the spiral motion of the spindle 8 through the passage 7. At the same time the water issuing from the passage 7 flows outwardly through the plug 22 and moistens the brushes inside of the tumbler as they are rotated upon the head against the glass. In the meantime the glass is being held by the hand of the operator against rotation and in being pushed downwardly is washed upon the outside by the brushes 28. When the pressure upon the glass is released, the water again asserts itself to raise the spindle and attached brush-head, both rotating as described.

The necessary cleansing effect may be had by the repetition of the foregoing action, causing a simultaneous reciprocative and rotative action of the head which brings the inner and outer surfaces of the glass into operative contact with the brush-bristles in both directions of its travel.

The water is jetted upwardly axially of the head and through the branch tubes 30 only when the valve-disk 12 is depressed; otherwise the pressure of water closes the valve.

The pipe 2 may be detachably connected to a water faucet and the overflow drain into a sink of ordinary construction, as will be readily understood.

What I claim as new and desire to secure by Letters-Patent of the United States is—

1. In a washing device of the character described, a water supply pipe, a cylinder mounted upon said pipe provided with a nut having a spirally threaded passage therethrough, a spindle formed with a spiral thread engaged within said passage and formed with grooves in its side walls for the flow of water through said nut, a valve on said spindle adapted to close said passage with the water pressure, a tubular post connected to the upper end of said spindle formed with an opening in its lower end, and a brush-head mounted upon said post.

2. In a washing device of the character described, a water supply pipe, a cylinder mounted upon said pipe provided with a nut having a spirally threaded passage therethrough, a spindle formed with a spiral thread engaged within said passage and formed with grooves in its side walls for the flow of water through said nut, a valve on said spindle adapted to close said passage with the water pressure, a tubular post connected to the upper end of said spindle formed with an opening in its lower end, a brush-head mounted upon said post, and a brush-plug socketed in the end of said head formed with an axially arranged bore connecting with the interior of said post.

3. A washing device of the class described, comprising a water chamber having a water inlet and provided with a threaded passageway therethrough, a threaded spindle adapted to move within said threaded passageway and formed with grooves between its threads to permit the passage of liquid, a tubular post secured to the upper end of said spindle, means for directing liquid that passes said grooved spindle upwardly through said post, and cleaning devices associated with the top end of said post.

Signed at Seattle, Wash., this 8th day of November, 1914.

MORITAROW ISHIDA.

Witnesses:
H. T. SATON,
HORACE BARNES.

Copies of this patent may be obtained for five cents each, by addressing the "Commissioner of Patents, Washington, D. C."